US009823108B2

(12) United States Patent
Van Der Linde et al.

(10) Patent No.: US 9,823,108 B2
(45) Date of Patent: Nov. 21, 2017

(54) FUEL MANAGEMENT

(71) Applicants: Josef Johannes Van Der Linde, Bloemfontein (ZA); Alexander George Whitehead, Kuruman (ZA); Lynette Irene Whitehead, Kuruman (ZA)

(72) Inventors: Josef Johannes Van Der Linde, Bloemfontein (ZA); Alexander George Whitehead, Kuruman (ZA); Lynette Irene Whitehead, Kuruman (ZA)

( * ) Notice: Subject to any disclaimer, the term of this patent is extended or adjusted under 35 U.S.C. 154(b) by 361 days.

(21) Appl. No.: 14/297,874

(22) Filed: Jun. 6, 2014

(65) Prior Publication Data
US 2015/0013451 A1 Jan. 15, 2015

(30) Foreign Application Priority Data
Jun. 7, 2013 (ZA) .................................. 2013/04184

(51) Int. Cl.
*G01F 7/00* (2006.01)
*G01F 17/00* (2006.01)
*G01F 9/00* (2006.01)
*G01F 15/00* (2006.01)
*G01F 15/06* (2006.01)
*G01F 22/00* (2006.01)

(52) U.S. Cl.
CPC .............. *G01F 17/00* (2013.01); *G01F 9/001* (2013.01); *G01F 15/007* (2013.01); *G01F 15/063* (2013.01); *G01F 22/00* (2013.01)

(58) Field of Classification Search
USPC .................................................... 73/195, 196
See application file for complete search history.

(56) References Cited

U.S. PATENT DOCUMENTS

| | | | | | |
|---|---|---|---|---|---|
| 2,960,294 | A | * | 11/1960 | Johnston | ................. B64C 17/10 137/98 |
| 5,325,836 | A | * | 7/1994 | Orzel | .................. F02D 19/0605 123/1 A |
| 5,598,817 | A | * | 2/1997 | Igarashi | ................ F02D 41/062 123/179.17 |
| 6,345,608 | B1 | * | 2/2002 | Rembold | ............... F02M 59/34 123/456 |
| 6,629,521 | B1 | * | 10/2003 | Kato | ....................... F02B 75/22 123/687 |

(Continued)

*Primary Examiner* — Clayton E Laballe
*Assistant Examiner* — Warren K Fenwick
(74) *Attorney, Agent, or Firm* — Grossman Tucker; Perreault & Pfleger PLLC

(57) ABSTRACT

The invention relates to a fuel management system for a vehicle. The fuel management system includes a fill-up sensor located at an inlet of a fuel tank of the vehicle, for determining the volume of fuel flowing into the fuel tank, a fuel supply sensor located in a fuel line between the fuel tank and an engine of the vehicle, for determining the volume of fuel flowing to the engine of the vehicle and a return line sensor located in the fuel return line of the vehicle, for determining the volume of fuel returning to the fuel tank. The system further includes a controller in communication with the fill-up sensor, fuel supply sensor and return line sensor, for collecting data from the sensors, calculating whether there is a fuel deviation between the amount of fuel entering the fuel tank and consumed by the vehicle, and generating fuel deviation events.

25 Claims, 2 Drawing Sheets

(56) References Cited

U.S. PATENT DOCUMENTS

| | | | | |
|---|---|---|---|---|
| 6,810,671 | B2* | 11/2004 | Hansen | F02C 7/22 417/244 |
| 6,877,488 | B2* | 4/2005 | Washeleski | B60K 15/03504 123/41.31 |
| 7,123,164 | B2* | 10/2006 | Zoladek | G07C 5/008 340/870.07 |
| 7,739,004 | B2* | 6/2010 | Johnson | F02C 9/46 701/1 |
| 8,402,817 | B2* | 3/2013 | Mellone | B67D 7/0496 141/45 |
| 2007/0129878 | A1* | 6/2007 | Pepper | B60W 40/12 701/123 |
| 2010/0235076 | A1* | 9/2010 | Ofek | G01C 21/3469 701/123 |
| 2011/0214643 | A1* | 9/2011 | Blizard | F02M 53/02 123/468 |
| 2011/0226906 | A1* | 9/2011 | Spottiswoode | B64C 17/10 244/135 C |

* cited by examiner

FUEL MANAGEMENT

CROSS REFERENCE TO RELATED APPLICATIONS

This Application claims the benefit of South African Patent Application No. 2013/04184, filed Jun. 7, 2013, the entire content of which is incorporated herein by reference.

FIELD

THIS INVENTION relates to fuel management. Specifically the invention relates to a fuel management system for a vehicle and a method of managing fuel in a vehicle.

BACKGROUND OF THE INVENTION

Fuel theft is a problem in the transport industry, where high volumes of fuel is stolen leading to great financial losses. Typically fuel is stolen by siphoning fuel from a vehicle's main fuel tank. Many devices have been developed to prevent fuel from being siphoned from the tank. These devices are generally in the form of inserts which are attached to the neck of the fuel tank, and prevents a tube from being inserted into the tank, alternatively devices which notifies a owner of the vehicle when the fuel cap is opened.

Although these devices are reasonably effective to prevent fuel from being siphoned from the fuel tank, there are many other methods of stealing fuel, which is not prevented by these devices. Fuel may for example be siphoned from the return fuel line, siphoned from the drain plug, or at fuel pumps the fuel that is purchased by the driver may be dispensed into another vehicle or container.

The inventor identified a need for a new fuel management system, which overcomes the above-mentioned problems.

SUMMARY OF THE INVENTION

According to a first aspect of the invention there is provided a fuel management system for a vehicle, which includes a fill-up sensor located at an inlet of a fuel tank of the vehicle, for determining the volume of fuel flowing into the fuel tank;

a fuel supply sensor located in a fuel line between the fuel tank and an engine of the vehicle, for determining the volume of fuel flowing to the engine of the vehicle;

a return line sensor located in the fuel return line of the vehicle, for determining the volume of fuel returning to the fuel tank; and a controller in communication with the fill-up sensor, fuel supply sensor and return line sensor, for collecting data from the sensors, calculating whether there is a fuel deviation between the amount of fuel entering the fuel tank and consumed by the vehicle, and generating fuel deviation events.

The fuel supply sensor may be located between the fuel tank and any one of a vehicle fuel injector pump and a vehicle carburetor.

In a vehicle that has more than one fuel tank, the system may include additional fuel fill-up sensors for each of the additional fuel tanks.

The fuel management system may further include a fuel level meter in the fuel tank of the vehicle, in communication with the controller. The fuel level meter may be in the form of a piezoelectric sensor.

The sensors may be in the form of flow meters, operable to measure the flow of fuel at the point where the flow meters are installed. The flow meters may be in the form of transducers. The transducers may be operable to communicate the flow of fuel measurements (data) to the controller, and in which the controller is operable to convert the fuel flow measurements into volume.

The fuel management system may further include an identification input device controllably connected to a fuel valve located in a fuel line of the vehicle, the identification input device operable by a driver of the vehicle to identify himself, the identification input device in communication with the fuel valve such that successful identification of the driver opens the fuel valve and allows the engine of the vehicle to be started, the identification input device is in communication with the controller such that fuel consumption data collected is ascribed to use of a vehicle by a particular driver. The input device may be in the form of keypad. A driver may enter a unique pin code to open the fuel valve and allows the engine of the vehicle to be started. A driver may be logged off the system when the engine is switched off, forcing the driver to log on before being able to start the engine.

The fuel management system may include a real time clock in communication with the controller, for ascribing fuel consumption data collected to a particular date and time. The fuel management system may also include a GPS receiver in communication with the controller, for ascribing fuel consumption data collected to a specific location. Particularly, if a fuel deviation occurs, the name of the driver, time and date when the deviation took place, and the location where the deviation took place will be captured by the controller.

The fuel management system may further include fill up detail input means communicating the volume of fuel purchased at a fuel station to the controller, the fill up detail input means being in the form of an automated message received by the controller. The automated message may be received by the controller from a fuel station when fuel has been purchased, or from a financial institution, when fuel has been purchased by a particular driver.

The controller may be in the form of a programmable logic controller. The controller may include a data logger.

The controller may include a transmitter for transmitting data. The controller may include a receiver for receiving instructions. In one embodiment the controller may include a transceiver.

The controller may be operable to compare the volume of fuel purchased, as obtained from the fill up detail input means, with the volume of fuel that flowed through the inlet of the vehicle fuel tank as measured by the fill-up sensor and in which the controller is further operable to generate a fuel deviation event, if the volume of fuel that flowed through the inlet of the vehicle fuel tank is less than the volume of fuel purchased.

The controller may be operable to calculate a fuel deviation and to generate a fuel deviation event when fuel purchased exceeds a hypothetical volume in the fuel tank, by calculating an initial hypothetical volume of fuel in the fuel tank of the vehicle by adding the volume of fuel flowing through the fill-up sensor to any residual fuel in the tank, to obtain an initial hypothetical volume of fuel in the tank;

subtracting the volume of fuel that flows through the fuel supply sensor over a period of time from the initial hypothetical volume of fuel in the tank;

adding the volume of fuel that flows through the return line sensor over the period of time to the initial hypothetical volume of fuel in the tank to provide a final hypothetical volume;

subtracting the final hypothetical volume of fuel in the tank form the volume capacity of the fuel tank of the vehicle to provide a hypothetical void volume in the fuel tank; and comparing the volume of fuel purchased with the hypothetical void volume in the fuel tank.

The controller may re-calculate the hypothetical volume in the fuel tank when a flow is sensed at any one or more of the sensors, when the engine of the vehicle is started, or the like. The controller may be set to re-calculate the hypothetical volume in the fuel tank at periodic intervals.

The controller may further generate a fuel deviation event when the fill-up sensor senses negative flow in the form of fuel flowing out of the fuel tank.

The controller may also generates a fuel deviation event when the fuel level in the tank, as measured by the fuel level meter, reduces while the vehicle engine is switched off.

The system may include a remote server in wireless communication with the controller, the wireless communication being through any one or more of a mobile telephone network, GSM network and the Internet.

The remote server may be operable to receive data and fuel deviation event information from the controller of the vehicle.

The remote server may be operable to generate an alert when a fuel deviation event has been generated by a controller.

The remote server may alert a registered user when a fuel deviation event has been generated by a controller. When the controller generates a fuel deviation event, the controller or remote server may send a data message to a registered user, owner of the vehicle, fleet management system, satellite tracking system or the like, notifying the user that fuel theft took place. Alerting a registered user may be by way of wireless communication through a mobile telephone network, GSM network or the Internet. In a preferred embodiment the registered user may be an owner of the vehicle, an owner of a fleet of vehicles, a manager of a transport company or the like.

The fuel management system may include immobilization means, to immobilize a vehicle when a fuel deviation event has been generated by the controller. The remote server may instruct the controller to close a fuel valve located in the fuel line of the vehicle thereby preventing the engine to be started.

The fuel management system may include an alarm installed in the vehicle connected to the controller and operable to be sound when a fuel deviation event has been generated by the controller.

The fuel management system may include data storage means, for storing any one of the data collected by the sensors and the hypothetical volumes in the fuel tank as calculated by the controller, the data storage means being in the form of a database hosted on any one or both of the remote server and controller.

The database may be accessible to a registered user.

The fuel management system may be linked to any one of a satellite tracking system and a fleet management system.

The invention further extends to a method of monitoring fuel in a vehicle, which includes the steps of determining the volume of fuel flowing into a fuel tank of the vehicle;

determining the volume of fuel flowing to an engine of the vehicle;

determining the volume of fuel returning from the engine of the vehicle to the fuel tank of the vehicle;

calculating the difference between the volume of fuel flowing into the engine and the volume of fuel returning to the fuel tank, to obtain an actual fuel usage volume; and calculating the difference between the volume of fuel flowing into the fuel tank and the actual fuel usage volume to obtain a hypothetical volume in the fuel tank.

The method may include the prior step of determining the volume of fuel in a fuel tank of the vehicle and adding the calculated difference between the volume of fuel flowing into the fuel tank and the actual fuel usage volume to obtain the hypothetical volume in the fuel tank.

The method may include the further step of comparing the hypothetical volume in the fuel tank with an actual volume of fuel in fuel tank, obtained from a fuel level meter, and if the hypothetical volume in the fuel tank is less than the actual volume in the fuel tank, generating a fuel deviation event.

The method may include a subsequent step of calculating the hypothetical void volume in the fuel tank, by subtracting the hypothetical volume of fuel in the fuel tank from the volume capacity of the fuel and generating a fuel deviation event when a higher volume of fuel flows into the fuel tank than the hypothetical void volume of the fuel tank.

The invention will now be described, by way of example only with reference to the following drawing(s):

DRAWING(S)

In the drawing(s):

In the drawings, like reference numerals denote like parts of the invention unless otherwise indicated.

EMBODIMENT OF THE INVENTION

Figure 1:
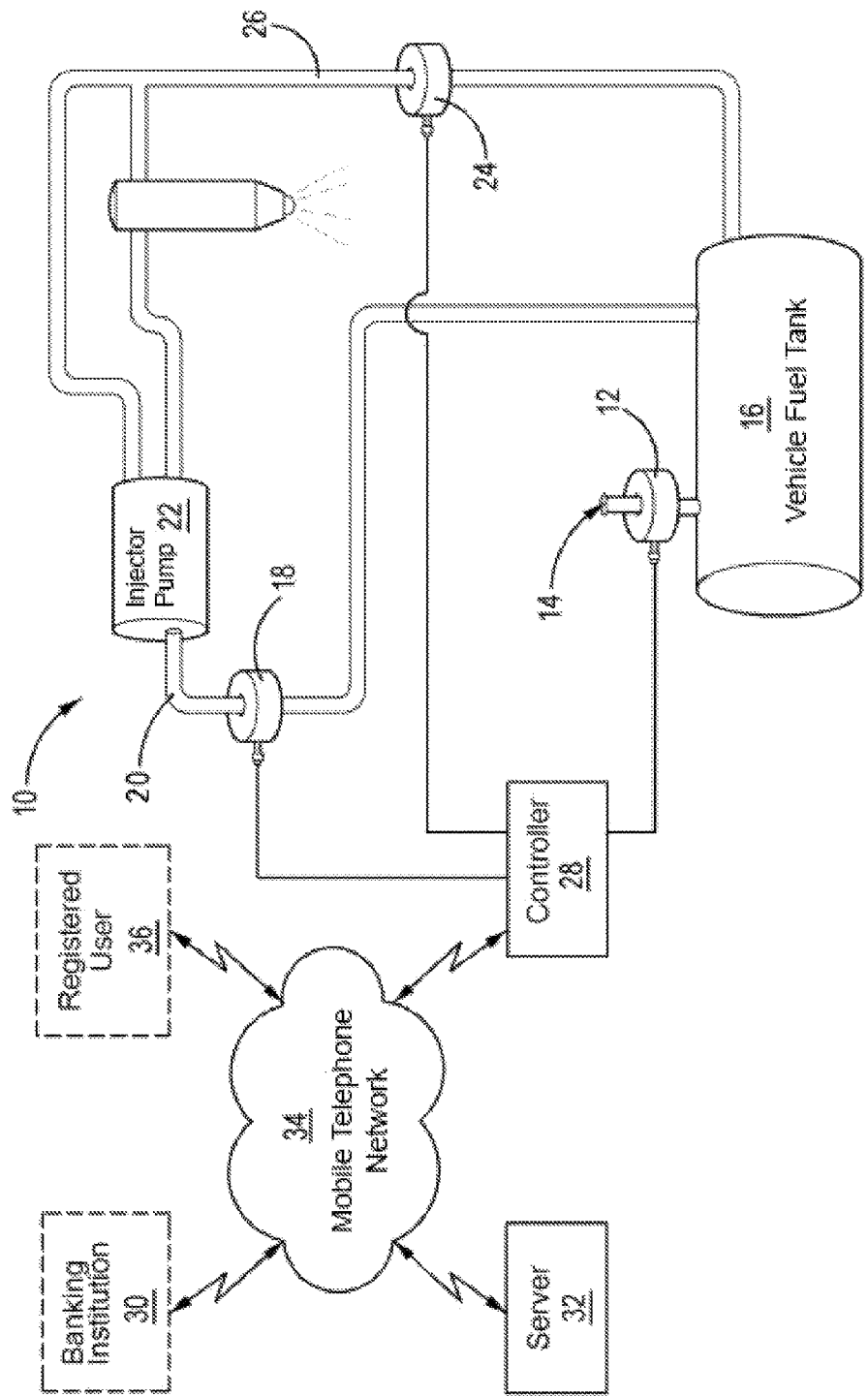
FIG. 1 shows a schematic representation of a fuel management system in accordance with the invention.

In FIG. 1, reference numeral 10 refers to a fuel management system for a vehicle. The system includes a fill-up sensor 12 located at an inlet 14 of a fuel tank 16 of the vehicle, for determining the volume of fuel flowing into the fuel tank 16. The system 10 also includes a fuel supply sensor 18 located in a fuel line 20 between the fuel tank 16 and injector pump 22 of the vehicle, for determining the volume of fuel flowing into the injector pump 22. The system 10 further includes a return line sensor 24 located in the fuel return line 26 of the vehicle, for determining the volume of fuel returning to the fuel tank 16. The system 10 also includes a controller 28 in communication with the fill-up sensor 12, fuel supply sensor 18 and return line sensor 24, for collecting data from the sensors 12, 18, 24 and calculating whether there is a fuel deviation between the amount of fuel entering the fuel tank and consumed by the vehicle, and generating fuel deviation events.

The data collected is in the form of the volume of fuel that flows through a particular portion of the vehicle in which the sensors 12, 18, 24 are installed. In this example the sensors 12, 18, 24 are in the form of flow meters. The flow meters are in the form of transducers that measure the flow of fuel through the fuel lines where the transducers are installed. The transducers communicate the data to the controller 28, which converts the measurements into volume (Liters).

The transducers 12, 18, 24 are also operable to sense the direction of flow. In a case where the fill-up sensor 12 senses negative flow in the form of fuel flowing out of the fuel tank 16, the controller 28 generates a fuel deviation event.

In this example the fuel management system further includes an input device (not show), operable by a driver of the vehicle. The input device is in the form of keypad. The keypad is connected to a fuel valve of the vehicle. The driver enters a unique pin code to open the fuel valve and allows the engine of the vehicle to be started. A driver is logged off the system when the engine is switched off, forcing the driver to log on before being able to start the engine. In this way all data collected will be ascribed to use of a vehicle by a particular driver.

The fuel management system 10 also includes a real time clock (not shown) in communication with the controller 28, for ascribing the data collected to a particular date and time. The fuel management system 10 further includes a GPS receiver (not shown) in communication with the controller 28, for ascribing the data collected to a specific location. Particularly, if a fuel deviation occurs, the name of the driver, time and date when the deviation took place, and the location where deviation took place will be communicated to the controller 28.

The fuel management system 10 further includes fill up detail input means. The fill up detail input means communicates the volume of fuel purchased at a fuel station, for the particular vehicle by the driver. The fill up detail input means is in the form of an automated message received by the controller 28 from a financial institution 30, when fuel has been purchased by a particular driver.

The controller 28 is in the form of a programmable logic controller. The controller 28 includes a transceiver for transmitting data and receiving instructions.

The controller 28 is operable to compare the volume of fuel purchased, as obtained from the fill up detail input means, with the volume of fuel that flowed through the inlet of the vehicle fuel tank as measured by the fill-up sensor 12. If the volume of fuel that flowed through the inlet 14 of the vehicle fuel tank 16 is less than the volume of fuel purchased, the controller 28 will generate a fuel deviation event.

The controller 28 calculates a fuel deviation, by calculating the hypothetical volume of fuel in the fuel tank of the vehicle. The hypothetical volume of fuel is calculated by adding the volume of fuel flowing through the fill-up sensor 12 to any residual fuel in the tank 16, to obtain a hypothetical volume of fuel in the tank 16. The volume of fuel that flows through the fuel supply sensor 18 over a period of time is subtracted from the hypothetical volume of fuel in the tank and the volume of fuel that flows through the return line sensor 24 over the period of time is added to the hypothetical volume of fuel in the tank 16. The capacity of the fuel tank of the vehicle, minus the hypothetical volume of fuel in the tank 16, provides a hypothetical void volume in the fuel tank 16. In use, when the volume of fuel purchased is more than the hypothetical void volume in the fuel tank 16, the controller 28 will generate a fuel deviation event.

The controller 28 re-calculates the hypothetical volume in the fuel tank 16 when a flow is sensed at any one or more of the sensors 12, 18, 24, when the engine of the vehicle is started. The controller 28 is further set to re-calculate the hypothetical volume in the fuel tank at periodic intervals.

The system 10 includes a remote server 32 in wireless communication with the controller 28. The wireless communication is through a mobile telephone network 34.

The remote server 32 receives data from the controller 28 of the vehicle. The remote server 32 alerts a registered user 36 when a fuel deviation event has been generated by a controller. Alerting a registered user 36 is by way of wireless communication through the mobile telephone network 34. In this example the registered user 36 is a manager of a transport company to which the vehicle belongs. The remote server 32 includes immobilization means, to immobilize the vehicle when a fuel deviation event has been generated. The remote server immobilizes the vehicle by closing a fuel valve located in the fuel line of the vehicle thereby preventing the engine to be started.

The system 10 also includes data storage means, for storing the data collected by the sensors 12, 18, 24 and the hypothetical volume in the fuel tank 16 as calculated by the controller 28. The data storage means is in the form of a database stored on the remote server 32 and is accessible to a registered user.

In another embodiment (not shown) the system includes a fuel level meter in the fuel tank of the vehicle, in communication with the controller 28. The controller 28 will generate a fuel deviation event when the level of fuel in the fuel tank 16 decreases while the vehicle's engine is switched off. The system 10 may also provide for the controller 28 to compare the hypothetical volume calculated with the actual volume of fuel measured by the fuel level meter, and if there is a deviation between the volumes, generate a fuel deviation event.

Figure 2:
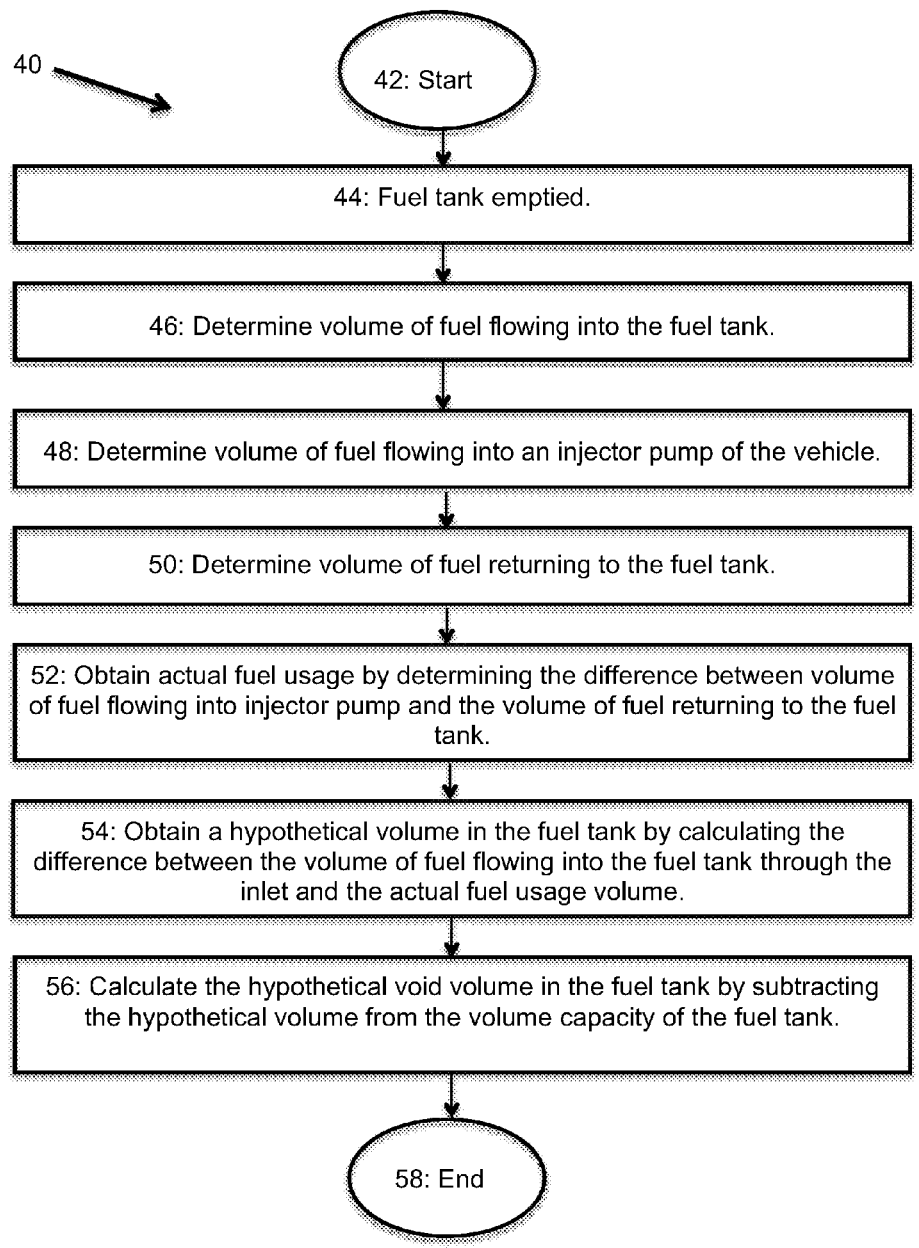
FIG. 2 shows a flow diagram of a method of managing fuel in a vehicle in accordance with a further aspect of the invention.

FIG. 2 shows a method of managing fuel in a vehicle 40. The method 40 commences at 42. At 44 the fuel tank 16 of the vehicle is emptied. The next step 46 is to determine the volume of fuel flowing into the fuel tank 16, through the inlet 14. The volume of fuel flowing into an injector pump 22 of the vehicle is also determined 48 and the volume of fuel returning to the fuel tank 16 of the vehicle is determined 50. The difference between the volume of fuel flowing into the injector pump 22 and the volume of fuel returning to the fuel tank 16 is then determined 52, to obtain an actual fuel usage volume. The difference is then calculated 54 between the volume of fuel flowing into the fuel tank 16 through the inlet 14 and the actual fuel usage volume to obtain a hypothetical volume in the fuel tank. Finally the hypothetical void volume in the fuel tank is calculated 56 by subtracting the hypothetical volume in the fuel tank from the volume capacity of the fuel tank 16. When a higher volume of fuel flows through the inlet 14 into the fuel tank 16 than the hypothetical void volume of the fuel tank, a fuel deviation event is generated. The method terminates at 58.

The inventor believes that the invention provides a new fuel management system which not only prevents fuel theft, but also provides a user with the volume of fuel stolen, the location of the theft, the responsible driver and the date and time of the theft.

What is claimed is:

1. A fuel management system for a vehicle, which includes:
   a fill-up sensor located at an inlet of a fuel tank of the vehicle, for determining the volume of fuel flowing into the fuel tank;
   a fuel supply sensor located in a fuel line between the fuel tank and an engine of the vehicle, for determining the volume of fuel flowing to the engine of the vehicle;
   a return line sensor located in the fuel return line of the vehicle, for determining the volume of fuel returning to the fuel tank; and
   a controller in communication with the fill-up sensor, fuel supply sensor and return line sensor, for collecting data from the sensors, calculating whether there is a fuel deviation between the amount of fuel entering the fuel tank and consumed by the vehicle, and generating fuel deviation events, the controller includes a transmitter for transmitting data;

a real-time clock in communication with the controller, the real-time clock configured to ascribe fuel consumption data collected to a particular date and time;

a GPS receiver in communication with the controller, the GPS receiver configured to ascribe fuel consumption data collected to a specific location; and an alarm connected to the controller and configured to sound when a fuel deviation event has been generated by the controller.

2. The fuel management system of claim 1, in which the fuel supply sensor is located between the fuel tank and any one of a vehicle fuel injector pump and a vehicle carburetor.

3. The fuel management system of claim 1, which includes a fuel level meter in the fuel tank of the vehicle, in communication with the controller.

4. The fuel management system of claim 3, in which the controller generates a fuel deviation event when the fuel level in the tank, as measured by the fuel level meter, reduces while the vehicle engine is switched off.

5. The fuel management system of claim 1, in which the sensors are in the form of flow meters, operable to measure the flow of fuel at the point where the flow meters are installed.

6. The fuel management system of claim 5, in which the flow meters are in the form of transducers.

7. The fuel management system of claim 6, in which the transducers are operable to communicate the flow of fuel measurements (data) to the controller, and in which the controller is operable to convert the fuel flow measurements into volume.

8. The fuel management system of claim 1, which includes an identification input device controllably connected to a fuel valve located in a fuel line of the vehicle, the identification input device operable by a driver of the vehicle to identify himself, the identification input device in communication with the fuel valve such that successful identification of the driver opens the fuel valve and allows the engine of the vehicle to be started, the identification input device is in communication with the controller such that fuel consumption data collected is ascribed to use of a vehicle by a particular driver.

9. The fuel management system of claim 1, which includes fill up detail input means communicating the volume of fuel purchased at a fuel station to the controller, the fill up detail input means being in the form of an message received by the controller.

10. The fuel management system of claim 9, in which the controller is operable to compare the volume of fuel purchased, as obtained from the fill up detail input means, with the volume of fuel that flowed through the inlet of the vehicle fuel tank as measured by the fill-up sensor and in which the controller is further operable to generate a fuel deviation event, if the volume of fuel that flowed through the inlet of the vehicle fuel tank is less than the volume of fuel purchased.

11. The fuel management system of claim 1, in which the controller is in the form of a programmable logic controller.

12. The fuel management system of claim 1, in which the controller includes a receiver for receiving instructions.

13. The fuel management system of claim 1, in which the controller is operable to calculate a fuel deviation and to generate a fuel deviation event when fuel purchased exceeds a hypothetical volume in the fuel tank, by calculating an initial hypothetical volume of fuel in the fuel tank of the vehicle by adding the volume of fuel flowing through the fill-up sensor to any residual fuel in the tank, to obtain an initial hypothetical volume of fuel in the tank;

subtracting the volume of fuel that flows through the fuel supply sensor over a period of time from the initial hypothetical volume of fuel in the tank;

adding the volume of fuel that flows through the return line sensor over the period of time to the initial hypothetical volume of fuel in the tank to provide a final hypothetical volume;

subtracting the final hypothetical volume of fuel in the tank form the volume capacity of the fuel tank of the vehicle to provide a hypothetical void volume in the fuel tank; and comparing the volume of fuel purchased with the hypothetical void volume in the fuel tank.

14. The fuel management system of claim 1, in which the controller generates a fuel deviation event when the fill-up sensor senses negative flow in the form of fuel flowing out of the fuel tank.

15. The fuel management system of claim 1, in which the system includes a remote server in wireless communication with the controller, the wireless communication being through any one or more of a mobile telephone network, GSM network and the Internet.

16. The fuel management system of claim 1, in which the remote server is operable to receive data and fuel deviation event information from the controller of the vehicle.

17. The fuel management system of claim 16, in which the remote server is operable to generate an alert when a fuel deviation event has been generated by a controller.

18. The fuel management system of claim 16, which includes immobilization means, to immobilize a vehicle when a fuel deviation event has been generated by the controller.

19. The fuel management system of claim 16, which includes data storage means, for storing any one of the data collected by the sensors and the hypothetical volumes in the fuel tank as calculated by the controller, the data storage means being in the form of a database hosted on any one or both of the remote server and controller.

20. The fuel management system of claim 19, in which the database is accessible to a registered user.

21. The fuel management system of claim 1, in which the system is linked to any one of a satellite tracking system and a fleet management system.

22. A method of monitoring fuel in a vehicle, which includes the steps of:

determining the volume of fuel flowing into a fuel tank of the vehicle; determining the volume of fuel flowing to an engine of the vehicle;

determining the volume of fuel returning from the engine of the vehicle to the fuel tank of the vehicle;

calculating the difference between the volume of fuel flowing into the engine and the volume of fuel returning to the fuel tank, to obtain an actual fuel usage volume; and calculating the difference between the volume of fuel flowing into the fuel tank and the actual fuel usage volume to obtain a hypothetical volume in the fuel tank.

23. The method of claim 22, which includes the prior step of determining the volume of fuel in a fuel tank of the vehicle and adding the calculated difference between the volume of fuel flowing into the fuel tank and the actual fuel usage volume to obtain the hypothetical volume in the fuel tank.

24. The method of claim 23, which includes the further step of comparing the hypothetical volume in the fuel tank with an actual volume of fuel in fuel tank, obtained from a fuel level meter, and if the hypothetical volume in the fuel tank is less than the actual volume in the fuel tank, generating a fuel deviation event.

25. The method of claim 23, which includes a subsequent step of calculating the hypothetical void volume in the fuel tank, by subtracting the hypothetical volume of fuel in the fuel tank from the volume capacity of the fuel and generating a fuel deviation event when a higher volume of fuel flows into the fuel tank than the hypothetical void volume of the fuel tank.

* * * * *